United States Patent
Ayer et al.

(10) Patent No.: US 8,848,058 B2
(45) Date of Patent: Sep. 30, 2014

(54) METHOD FOR ANALYZING THE MOTION OF A PERSON DURING AN ACTIVITY

(75) Inventors: Serge Ayer, Parvagny (CH); Pascal Binggeli, Liebefeld (CH); Thomas Bebie, Berne (CH); Michael Frossard, La Tour-de-Trême (CH); Philippe Schroeter, Grolley (CH); Emmanuel Reusens, Palézieux (CH)

(73) Assignee: Dartfish SA, Fribourg (CH)

( * ) Notice: Subject to any disclaimer, the term of this patent is extended or adjusted under 35 U.S.C. 154(b) by 1191 days.

(21) Appl. No.: 11/963,649

(22) Filed: Dec. 21, 2007

(65) Prior Publication Data

US 2008/0094472 A1   Apr. 24, 2008

(51) Int. Cl.
   *H04N 7/18* (2006.01)
   *A63B 69/00* (2006.01)
   *A63B 24/00* (2006.01)
   *G09B 19/00* (2006.01)

(52) U.S. Cl.
   CPC ............ *A63B 69/00* (2013.01); *A63B 24/0003* (2013.01); *G09B 19/0038* (2013.01); *A63B 2024/0012* (2013.01); *A63B 2220/806* (2013.01)
   USPC ........... 348/157; 348/153; 348/154; 348/155; 348/156; 386/239; 386/240; 386/241; 386/242

(58) Field of Classification Search
   USPC .......... 348/153, 154, 155, 156, 157; 386/239, 386/240, 241, 242
   See application file for complete search history.

(56) References Cited

U.S. PATENT DOCUMENTS

| | | | |
|---|---|---|---|
| 2,939,224 A | 6/1960 | Rose et al. | |
| 3,197,888 A | 8/1965 | Held | |
| 5,184,295 A | 2/1993 | Mann | |
| 5,333,061 A * | 7/1994 | Nakashima et al. | 386/264 |
| 5,947,742 A | 9/1999 | Katayama et al. | |
| 6,042,492 A | 3/2000 | Baum | |
| 6,293,802 B1 | 9/2001 | Ahlgren | |
| 6,533,675 B2 | 3/2003 | Funk | |
| 7,187,846 B2 * | 3/2007 | Saito | 386/241 |
| 2002/0028026 A1 * | 3/2002 | Chen et al. | 382/284 |
| 2002/0114493 A1 | 8/2002 | McNitt et al. | |
| 2002/0115047 A1 * | 8/2002 | McNitt et al. | 434/252 |
| 2005/0106543 A1 | 5/2005 | Day et al. | |
| 2006/0166737 A1 * | 7/2006 | Bentley | 463/30 |

FOREIGN PATENT DOCUMENTS

| | | |
|---|---|---|
| EP | 0351558 | 1/1990 |
| EP | 0926677 | 6/1999 |
| GB | 2351451 | 1/2001 |
| WO | WO-2004014061 | 2/2004 |

* cited by examiner

*Primary Examiner* — Liangche A Wang
*Assistant Examiner* — Cheikh Ndiaye
(74) *Attorney, Agent, or Firm* — Blank Rome LLP (57) ABSTRACT

A method is disclosed for analyzing with a computer (1) the motion of an athlete (3), of a team or a patient during an activity, said method comprising the steps of defining a number of unevenly time-spaced key positions in said motion, said key positions being of particular interest for analyzing the correct execution of said motion by said athlete (3) or team. A video sequence (11) of said motion is acquired with a camera (2) and still pictures (12) are extracted from said video sequence (11). Templates can trigger the automatic extraction of still pictures (12). For extraction purposes, a metadata recorded with a sensor (5) at the same time as the video sequence (11) can be used. Said still pictures (12) correspond to said previously defined key positions. Thereafter said extracted still pictures (12) are displayed simultaneously on a same display (10).

38 Claims, 6 Drawing Sheets

Fig. 8

METHOD FOR ANALYZING THE MOTION OF A PERSON DURING AN ACTIVITY

REFERENCE DATA

This application is a continuation of PCT/EP2005/053331, filed Jul. 12, 2005, the contents of which are incorporated by reference.

FIELD OF THE INVENTION

The present invention concerns a method for analyzing the motion of a person or of a team during an activity according to the independent method claim. This could be for example a sporting or medical activity. The invention also concerns a computer program product and computer media storage.

DESCRIPTION OF RELATED ART

US-A1-2002/0114493 for example discloses an analysis system and method for providing athletic training and instruction by sensing different types of information, such as video, positional information, weight transfer information, etc. and synchronizing the information. The synchronized information is replayed for the user in a manner that enables simultaneous viewing of an athletic motion along with calculations and presentation of analysis information related to the athletic motion.

The system according to WO-A3-2004/014061 automatically extracts cinematic features, such as shot types and replay segments, and object-based features, such as the features of detecting referee and penalty box objects. The system uses only cinematic features to generate real-time summaries of soccer games, and uses both cinematic and object-based features to generate near real-time, but more detailed, summaries of soccer games. The techniques include dominant color region detection, which automatically learns the color of the play area and automatically adjusts with environmental conditions, shot boundary detection, shot classification, goal event detection, referee detection and penalty box detection.

EP-A2-0 351 558 discloses another motion analysis tool for viewing the repetitive motion of an object, the tool having a video camera for producing images of the object as it moves, a strobe directed at the object for illuminating the object while the image is taken, a controller for capturing a series of video images over a number of cycles of the object wherein only one image is captured in a cycle and each successive image is advanced by a predetermined step of time in successive cycles so that when the series of images is displayed, a slow motion view of the object is provided while the object moves in the repetitive motion. The analysis tool provides a viewing window wherein the full cycle or only a selected portion of the cycle can be repeatedly viewed. The predetermined steps of time can be varied to increase the resolution.

US-A1-2005/0106543 proposes a method for providing instruction to a student in golf or other sports. In accordance with the method, a video file is received of the student practicing the sport. The video is then assembled into an executable viewer file accessible on a web site, and the student is notified when the viewer file is available on the web site.

U.S. Pat. No. 6,042,492 describes a sports analysis and testing system including a plurality of high-speed digital video cameras, each aimed at a player from a different perspective to record their movements and those of a ball in play. In a baseball application, a programmed computer interfaced to the video cameras and various optional sensors includes application software to generate performance statistics as a function of the pitch, hit, and bat swing. If previously obtained batting performance data are available, the system many also be used to generate a database containing historical performance statistics, including real-time measurements of many characteristics, including pitched and batted ball speeds and trajectories, bat swing timing, speeds, and swing angles, location over the plate, and ball-bat contact location.

U.S. Pat. No. B2-6,533,675 discloses a method and apparatus for tracking and analyzing a golf swing.

All above systems are poorly adapted for an athlete who wants to train and repeat a particular motion. In many sports, correct execution of a motion strongly depends on the athlete or team position at one or several precisely defined moments, called key position(s). For example, a golfer may want to correct the position of his arms, legs and trunk at the maximum swing of the club, and then at the precise moment when the club hits the ball.

The key positions depend on the execution of the motion and are generally not equally spaced. Key positions have no duration, for example when a golf club hits the ball or when a jumper leaves the ground.

Successful training of this motion requires repeating the motion and checking the athlete or team position at each predefined key position antis the motion is successfully executed.

Furthermore, extraction of evenly spaced frames from a video sequence and display of the frames as mosaic or as superimposed pictures give a stroboscopic effect. The drawback of evenly spaced frames is that they do not take into account key positions, which are important for analyzing the motion of the sporting activity. Key positions may be between two selected frames. As well, many similar pictures of little interest are produced, when the athlete is moving slowly, or not moving at all.

BRIEF SUMMARY OF THE INVENTION

It is the aim of the present invention to create a method for analyzing the motion of an athlete or of a team during a sporting activity without the aforementioned drawbacks.

In particular, it is the aim of the present invention to create a method for analyzing the motion of an athlete or of a team during a sporting activity or a patient during rehabilitation with the possibility of better analysis of the key positions for a certain sport.

It is another aim of the present invention to record metadata at the same time when the motion of the activity is recorded in order to be able to extract key positions for the activity, and to display other useful information to the athlete, a coach, a patient or a doctor.

It is another aim of the present invention to create a computer program product for storing a program for performing the proposed method, when executing said program on said computer.

It is another aim of the present invention to create a computer storage media storing a multimedia document produced with the proposed method.

According to the invention, these aims are achieved by means of a method for analyzing the motion of a person or of a team during an activity with a computer, said method comprising the steps of:

(a) defining a number of key positions in said motion, said key positions being of particular interest for analyzing the correct execution of said motion by said athlete or team, (b) acquiring at least one video sequence of said motion, (c) extracting still pictures from said at least one video sequence, said still pictures corresponding to said previously defined key positions and
(d) displaying said extracted still pictures.

The still pictures to be extracted may be determined using metadata recorded with said video sequence, such as trigger signals with some moments of said video sequence. Alternatively, or in addition, the extraction may be based on an analysis of the sound track and/or image concern of the video sequence.

The dependent claims give advantageous embodiments of the inventive method.

The still picture can be extracted manually or automatically from said video sequence, e.g. using metadata recorded with said video sequence, analyzing the sound track of said video sequence or analyzing the image content of one video sequence. Metadata can advantageously be created by a sensor such as a microphone, an accelerometer, a force sensor/force plate, a speed sensor, a position sensor, including GPS, contact or contactless position sensor, including infrared ray, a human operated sensor, including computer, PDA, a cell phone and/or a button.

There are different possibilities for displaying the video sequence and the still pictures on the screen, e.g. similtaneously with the video sequences such that the video sequence is displayed and said still pictures are displayed on the screen in the moment when they occur in said video sequence. Furthermore, in order to better distinguish them, it would be possible to display all still pictures, but make a visual distinction between the pictures before and after their occurrence in a video sequence. It is also possible to superimpose two extracted still pictures, or to superimpose one or several still pictures at key positions on a video sequence. In still another embodiment, pictures of key positions can be overlaid at their original spatial location over each image of the original video sequence 11. In a special embodiment oddly past key positions are overlaid over the common background.

Furthermore, different diagrams, graphics and/or symbols can be automatically generated and superimposed on the video sequence and/or still picture according to the predefined templates and/or user preferences. There are many possibilities for doing so in respect to the layout, color, position, etc. Templates, which can be predefined and/or manually defined by the user, can include such superimposed diagrams, graphics and/or symbols. In this way, templates define conditions for triggering the automatic superimposing of different diagrams, graphics and/or symbols on the still and/or video images.

It is intended to store a plurality of series of still pictures with or without the recorded metadata corresponding to different executions at different times of said motion by one or different athletes or teams in a single document e.g. on a CD-ROM, on a DVD and/or as a browser-enabled document. Such multimedia document can also include said video sequence. In this way, reference pictures or video sequences can be purchased by a doctor, an athlete or a user of the inventive method and downloaded from the Internet/loaded from a disc into said computer.

According to the invention, the mentioned aims are achieved by means of a computer program product according to claim 35 and a computer storage media storing a multimedia document according to claim 36.

BRIEF DESCRIPTION OF THE DRAWINGS

The invention will be better understood with the aid of the description of an embodiment given by way of example and illustrated by the figures, in which.

The same reference number will reference the same element in different drawings.

DETAILED DESCRIPTION OF POSSIBLE EMBODIMENTS OF THE INVENTION

According to the inventive method, a motion of a person, for example an athlete, or of a team during a sporting activity will be analyzed. It is the aim of the athlete or the team to train said particular motion a certain number of times. Such a motion can be a golf swing, the shot of a keeper of a soccer team, a penalty or free kick during said game or the motion before a player scores a goal, the motion of a swimmer for a specific style, etc. For the purpose of analyzing the motion, a number of key positions will be defined in a first step of the inventive method. These key positions have no duration, i.e. they are only a moment in said motion, and are important for the execution of the entire motion. Adapting a correct body position at each key position is an efficient way to train the entire motion. This could as well be important for medical purposes, e.g. during rehabilitation of a patient. In some embodiments, it is necessary to analyze the same motion for different angles of the same athlete or the goal from different positions with different cameras in order to determine or display a key position. In this invention for all stages (extracting still pictures at key positions, display video sequences, etc.) two or more cameras can be used.

An athlete may be interested in viewing or improving the position of the whole body or of a single part of the body, the relation of the two parts of the body, e.g. the angle of both arms to each other during swimming, the body at the maximum swing of a golf club or when the golf club hits the golf ball, etc. at each key position. Key positions will be different for each motion in each sport and, therefore, have to be defined individually in advance by an expert. Therefore, it is understandable that key positions are unevenly spaced in time and only depends on the importance of said position for the training of the entire motion to be analyzed.

Figure 1:
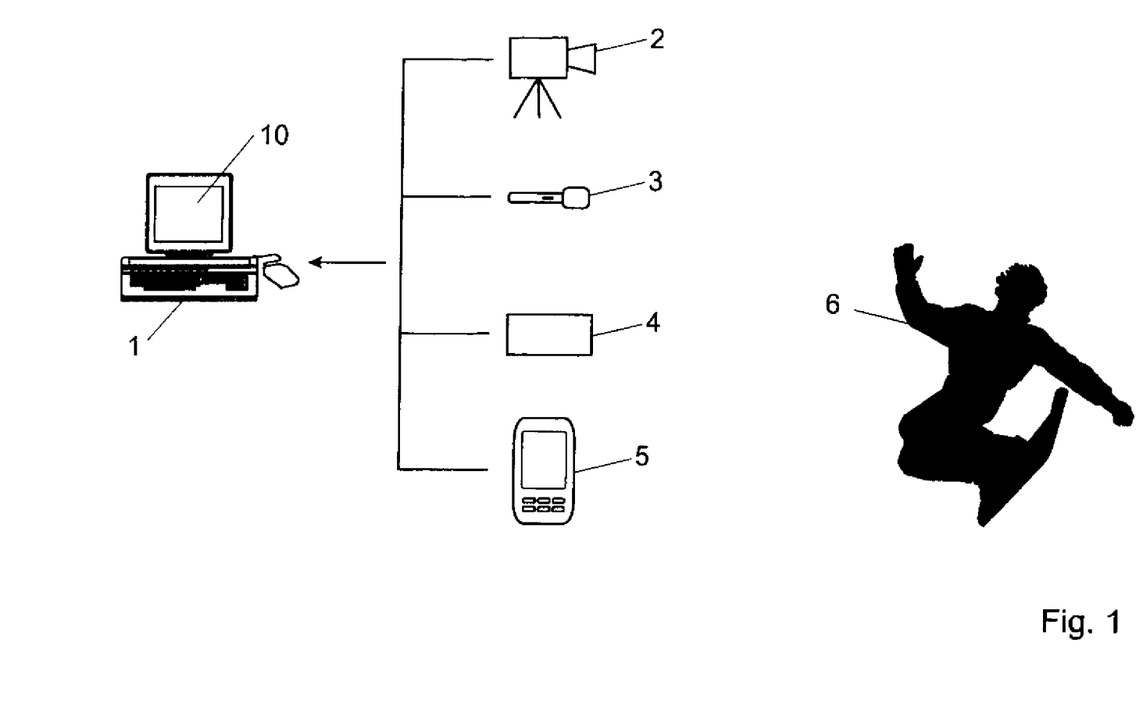
FIG. 1 shows an overall view of a system with which the inventive method can be performed.

FIG. 1 shows an overall view of a system with which the inventive method can be performed. A computer 1 is connected to a camera 2 in order to record the motion of an athlete 3. At the same time, metadata of said motion of said athlete 3 will be acquired, which has some significance for or in said motion. In FIG. 1, some examples of metadata and sensors 4, with which additional information for said video sequence 11 is recorded, are given. A sensor 4 can be e.g. a microphone 5 for simultaneously recording the sound track of said video sequence 11, an accelerometer, a force sensor/force plate, a speed sensor, a position sensor, including GPS, contact or contactless position sensor, including infrared ray, a human operated sensor, including computer, PDA 6, a cell phone, a button, etc. It would furthermore be possible to add metadata to the acquired video sequence 11 during image analysis, when viewing and/or analyzing said sequence 11 in the computer 1. This could as well include data from a second camera 2, which records the same motion from another viewpoint or angle. Any other trigger signal which can give a hint for a key position will be used in the inventive method.

The captured video sequence 11 yields still pictures 12, fixed-images, frozen frames or images extracted at the previously defined key positions. For the extraction said metadata recorded with one video sequence 11 with the sensors 4, the sound track of one video sequence and/or some image content of one video sequence 11, etc. is used. It would furthermore be possible to select still pictures 12, fixed-images, or frozen frames or images manually from one video sequence 11. Said extracted pictures 12 are displayed to the user for analyzing the motion as described in detail with respect to FIG. 6 below.

In a computer program within computer 1, different templates 7 are defined for different sports or for different motions in the same sport, said templates 7 determining the numbers of key positions for said sport or said motion. Templates 7 also determine the layout of the still pictures 12 on the display (size, position), and the symbols resp. graphics 13 that are automatically superimposed. The key positions in said templates 7 for the motion of a certain sport can be predefined and/or an be defined or added at least partly manually by the user. In this way, the user can adapt the sensors 4 used in his specific case for the motion he wants to train. Predefined templates 7 define at least one condition for triggering automatic extraction of one still picture 12. Templates 7 can define at least one comment or recommendation associated with said key position or can define the layout of said still pictures 12, when later displayed on said display 10.

If the user wishes to extend the sports and the key positions for that sport, the templates 7 for a certain sport can be downloaded from an Internet server, e.g. a special webpage, to which the user can connect the computer via a common web browser. In addition, he would be able to load the templates 7 from a disc previously bought in a shop into said computer 1.

Figure 2:
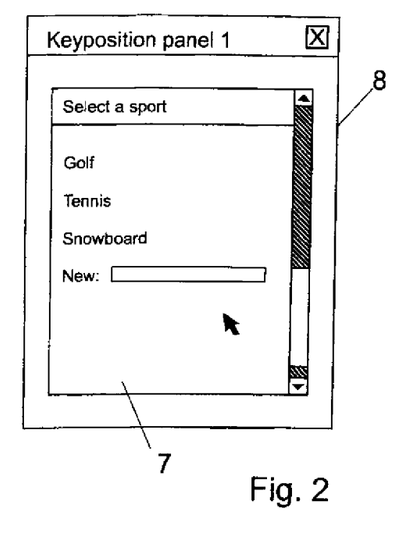
FIG. 2-4 illustrates different examples of key position panels for a user specific selection.
Figure 3:
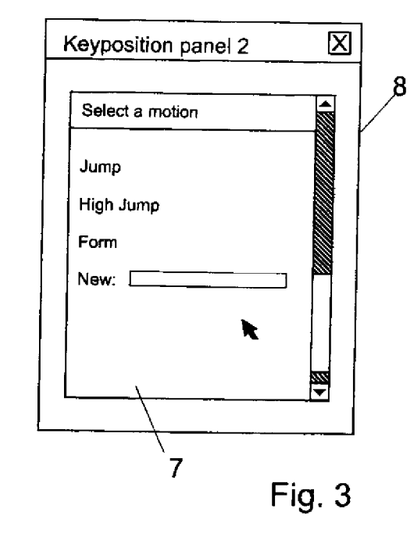
Figure 4:
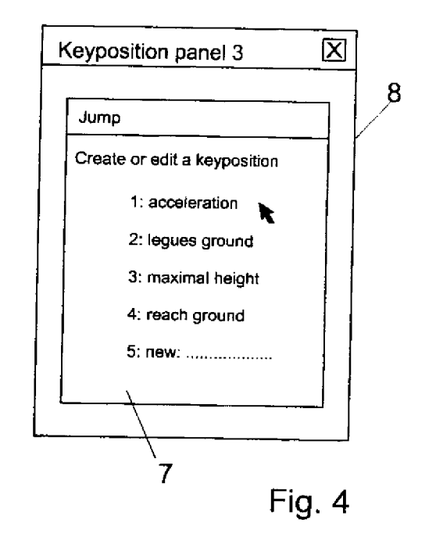
Figure 5:
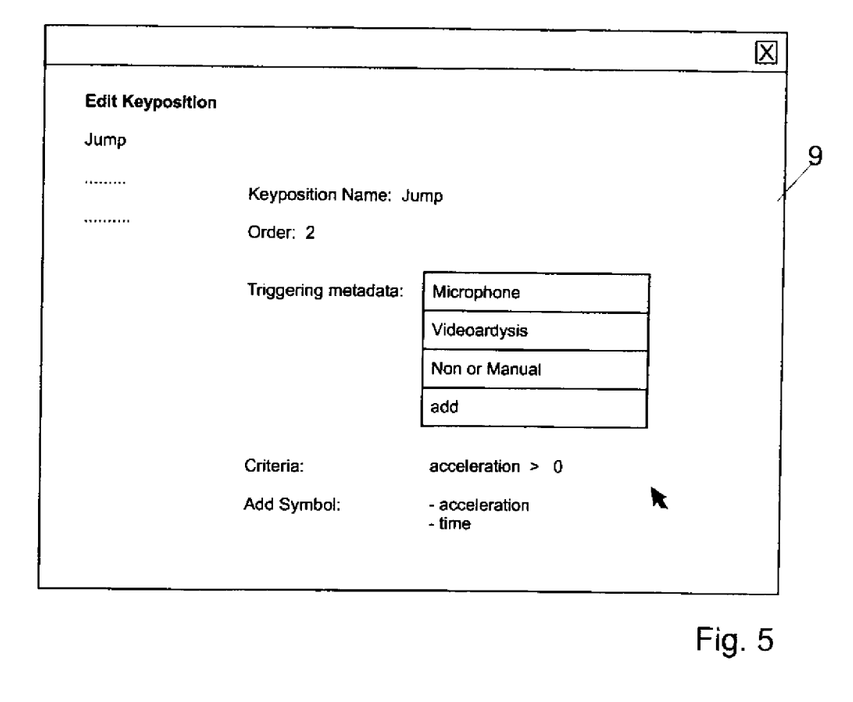
FIG. 5 illustrates an example for a key position definition panel to be edited by a user.
Figure 6:
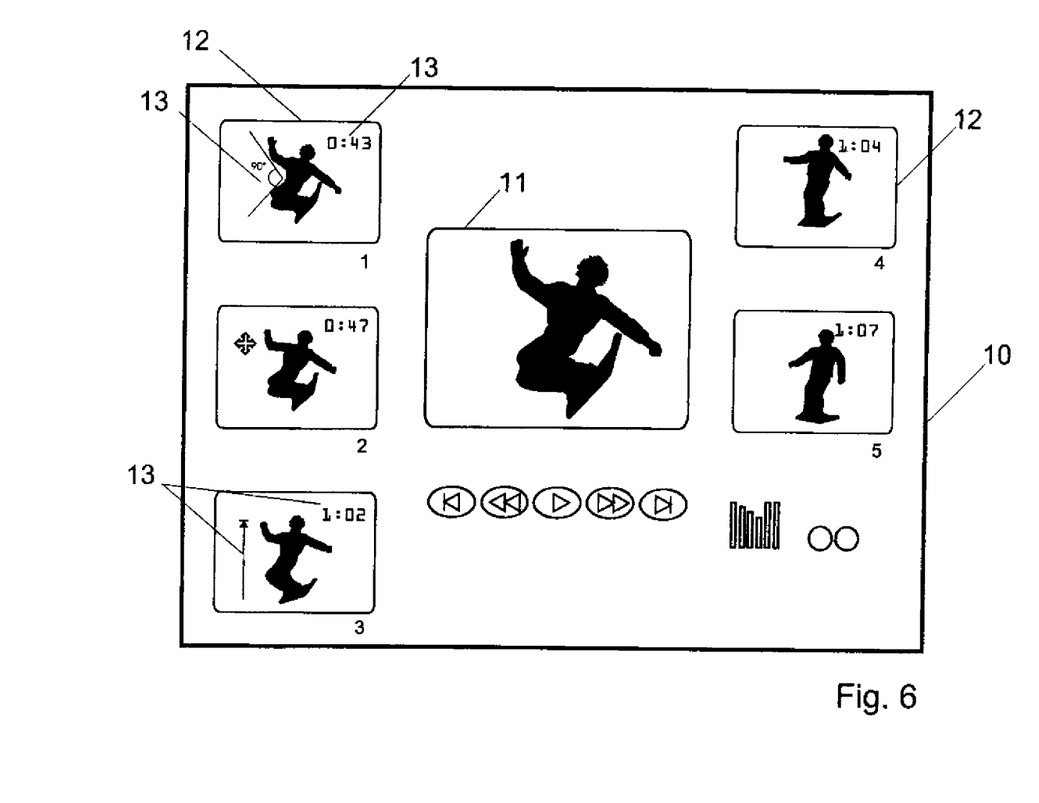
FIG. 6 shows a possible display with the recorded video sequence and the extracted still picture within the video sequence.

FIG. 2 to 4 illustrate different examples of key position panels 8 for a user-specific selection during the use of said computer. This, as seen in FIG. 2, a user can first select in a template 7 a sport in which he wishes to train, such as golf, tennis, jumping, swimming, baseball, etc. Or he can define a new sport in order to define himself a new template 7 with new key positions for a certain motion during the execution of said sport. Thereafter, the user has to choose a motion within said sport for which he would like to make the analysis (FIG. 3). When he has chosen the motion, the key position can be reviewed, chosen and/or edited in order to make a user specific adaptation. In this stage, as seen in FIG. 4, it is possible to couple the key positions to the sensors (or metadata) as mentioned above. FIG. 5 illustrates an example for a key position definition panel 9 to be edited by a user, which gives an overall view for all selected options. The mentioned comments or recommendations associated with said key position (e.g. speed>50 km/h, arrow for the direction of a ball, angle<45°, etc.) can presented to the user. Recommendations can include for example text, diagrams or audio signals indicating to the athlete how to improve the motion. Furthermore, it is possible:

- to display metadata received and/or computed from the microphone 4, the sensors 5, the PDA 6, the video sequence 11, etc. on said still picture 12, e.g. as alpha-numerical symbols;
- to display generated graphics 13 superimposed on the still picture 12, e.g. automatically generated graphics or non-manually edited graphics, for example in order to show the action of ideal direction, angle, position, etc. of the athlete 3 (see FIG. 6). Graphics may be based on the metadata,
- to display data in alpha-numerical and/or graphical form, computed from the metadata values and/or from image analysis software, and displayed only when some threshold values are reached by some metadata or functions of metadata.
- to automatically position the superimposed data;
- to layout automatically said graphics 13 and/or symbols (background or foreground color; font, etc.);
- to superimpose mentioned graphics 13 and/or symbols on the video 10 and/or still picture 12; and/or
- that the user defines for each motion to be analyzed how and when symbols or graphics 13 are added, e.g. using Boolean conditions on the metadata.

All those steps may be defined by the templates which may be stored as a data structure e.g. in a file or in a database. The data, symbols and graphics, their appearance, and/or the conditions for displaying them may depend on the metadata from the different sensors and video streams.

Conditions for deciding if an image corresponds to a key position can also depend on features extracted from images using preferably foreground extraction. Any motion of the background (trees, audience, a flag, etc.) that is perhaps moving (but still slower than the athlete 3) can be eliminated and only the key position of the sportsman is extracted. As well the background can be recorded as a first picture without any athlete in order to facilitate the foreground extraction.

There are different options for displaying both the video sequence 11 and the extracted still pictures 12 on a display 10 as schematically illustrated in FIG. 6. The still pictures 12 can be simultaneously displayed with said video sequence 11 on the same display 10, so that the video sequence 11 is displayed and said still pictures 12 are displayed on the screen at the moment when they occur in said video sequence 11. Furthermore, it would be possible to display all still pictures 12, preferably in different frames, but to make a visual distinction between the still pictures 12 corresponding to moments occurring before the moment currently shown by said video sequence 11, and the still pictures 12 corresponding to moments occurring after the moment currently shown by said video sequence 11. To proceed from one key position shown in still picture 12, it is possible that the selection of one of said still pictures 12 initiates the displaying of said video sequence 11 for the moment corresponding to said still picture 12.

In order to better be able to analyze the captured still picture 12 at one key position, the picture 12 can be compared with pre-recorded still pictures at the same key position of the same motion), which show a correct pose or position. Again, these pre-recorded still pictures 12 can be downloaded from an Internet server or can be loaded into said computer 1 from a disc bought in a shop. Both pictures (prerecorded still pictures and the extracted still pictures 12) can be superimposed or displayed one beside another. Furthermore, it would be possible to superimpose (or display one beside the other) two still pictures 12 recorded by the user. In this way the user can compare his key positions with the key positions of a friend, of his coach or a top athlete.

Figure 7:
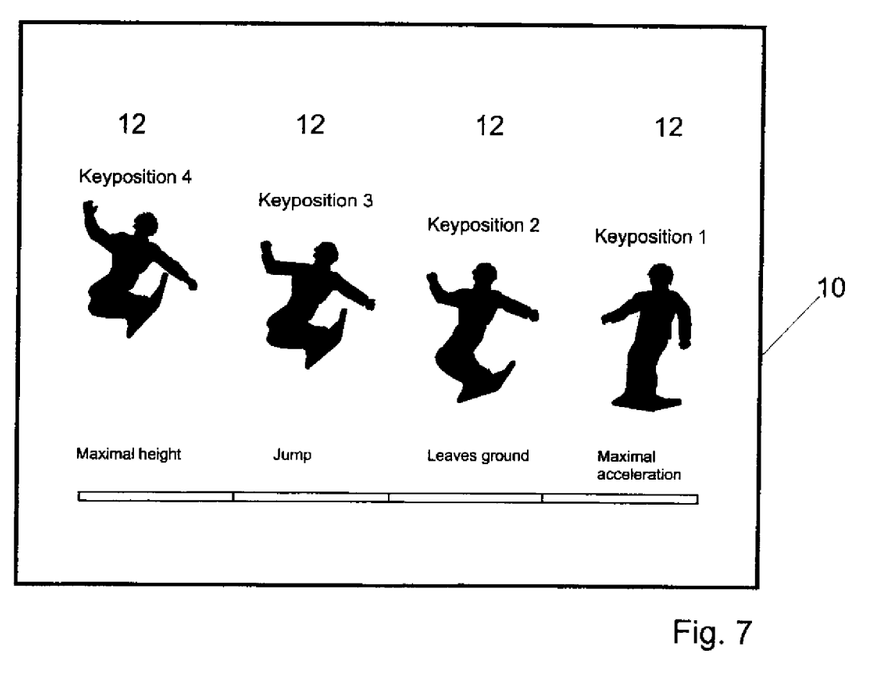
FIG. 7 shows a possible display with different still pictures extracted from the video sequence on a common background and FIG. 8 shows a special embodiment where only past key positions are overlaid.

FIG. 7 shows a display with different key positions extracted from the video sequence 11 superimposed on a common background build as a mosaic of the scene as spanned by the camera(s). Selected still pictures at key positions are overlaid at their original spatial location over said background to exemplify spatial and/or temporal relation between different still pictures at different key positions.

Figure 8:
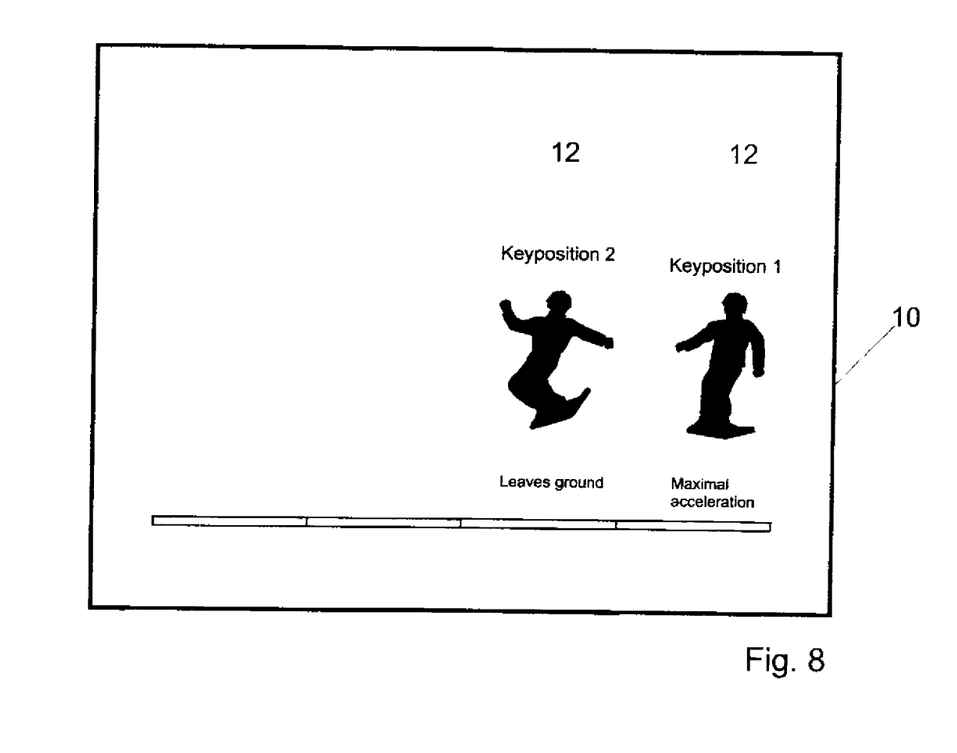

When playing the original video sequence 12, the image of the current video position is overlaid over the scene background to further exemplify the relation of the current position of the video with the surrounding key positions. Alternatively, when playing the original video, the key position corresponding to the current instantaneous video position is highlighted in the mosaic. Selecting key positions on the mosaic triggers then display of metadata and/or repositioning inside the original video. In still another embodiment, pictures of key positions can be overlaid at their original spatial location over each image of the original video sequence 11. FIG. 8 shows a special embodiment where only past key positions are overlaid over the common background.

Superimposing a selected foreground (for example an athlete) shown at different key positions on a common background can occur on the video sequence 11 and/or on the still pictures 12. Furthermore, the common background can be generated from several successive images in video streams delivered by one or several cameras.

In addition, diagrams and/or symbols 13 can be superimposed by the user, or generated or selected automatically (e.g. taken from the templates 7), over at least one of said still pictures 12 to point out the importance of the key position or the position of said athlete 3. The superimposed symbols or diagrams 13 can correspond to the mentioned metadata acquired simultaneously with said video sequence 11. In this way, superimposition of said symbols or diagrams 13 can be automatically decided when a predetermined condition occurs in a metadata, in the sound track of said video sequence, or in the image content of said video sequence. When a plurality of cameras is used, the metadata between different video sequences 11 can be exchanged. In this way one camera can record the speed of an activity or motion, while this is displayed on other still pictures extracted from another camera.

For the symbols or diagrams 13 a number of options are given. The layout and/or the position and/or the foreground or background color of can be adjusted or modified according to actual user requirements. The layout, and/or said position, and/or said color will depend on the image content of said still picture. A written commentary, a graphic 13, images, video clips and/or an audio comment can be as well added to at least one of said still pictures 12 and/or to the video sequence.

It is intended to store a plurality of series of still pictures 12 corresponding to different executions at different times of said motion by one or different athletes 3 or teams in a single document, e.g. on a CD-ROM, on a DVD and/or as a browser-enabled document. Such multimedia document can also include said video sequence 11. In this way, reference pictures 12 or video or video sequences 11 according to the inventive method can be purchased by a user or athlete 3 and downloaded from the Internet/loaded from a disc into said completer 1.

The invention is also related to a computer program product for storing a program for performing the inventive method when executing said program on said computer and to a computer storage media storing a multimedia document produced with the inventive method.

REFERENCE NUMBERS

1 Computer
2 Camera
3 Athlete, person, patient
4 Sensor
5 Microphone
6 PDA
7 Template
8 Key position panel
9 Key position definition panel
10 Display
11 Video sequence
12 Still picture
13 Graphic, symbol, diagram

The invention claimed is:

1. A method for analyzing a motion of a person or of a team during an activity with a computer, said method comprising the steps of:
    defining different templates for different motions, each of said templates determining a number of key positions for said motions, said at least one key position being of particular interest for analyzing the correct execution of said motion,
    defining in said templates at least one condition for triggering automatic extraction of one still picture at one of said key positions,
    determining in said template symbols or graphics to superimpose onto said still picture,
    acquiring at least one video sequence of said motion of the person or the team in a single scene,
    automatically extracting at least one still picture corresponding to said previously defined key position from said at least one video sequence, and
    displaying the at least one extracted still picture corresponding to said previously defined key position,
    superimposing onto said still picture graphics or symbols according to said template
    wherein the at least one of said still picture corresponding to said previously defined key position is automatically extracted using one or a combination of the following:
    using metadata recorded with a sensor for determining a key position of particular interest and recorded simultaneously with said video sequence,
    detecting in a sound track of said video sequence recorded simultaneously with said video sequence a sound corresponding to said key position, and
    detecting in an image content of said video sequence features of said key position.

2. The method of claim 1, comprising the step of creating metadata for extracting still pictures from said video sequence with a sensor comprising a human operated sensor, including PDA, a cell phone and/or a button.

3. The method of claim 1, comprising the step of displaying simultaneously said extracted still pictures on a same display.

4. The method of claim 1, wherein said still pictures are simultaneously displayed with said video sequence on the same display.

5. The method of claim 4, wherein still pictures corresponding to moments occurring before a moment currently shown by said video sequence, and still pictures corresponding to moments occurring after the moment currently shown by said video sequence, are distinguished on said display.

6. The method of claim 1, wherein said video sequence is displayed and said still pictures are displayed on the display at the moment when they occur in said video sequence.

7. The method of claim 1, comprising the step of displaying at least two extracted still pictures superimposed.

8. The method of claim 1, comprising the step of recording and displaying the same motion of the athlete from different cameras.

9. The method of claim 1, comprising the step of displaying the extracted still pictures superimposed at their original spatial location over the video sequence.

10. The method of claim 1, comprising the step of successively highlighting different still pictures when playing the video sequence.

11. The method of claim 1, comprising the step of displaying the still pictures of past key positions superimposed at their original spatial location over the video sequence.

12. The method of claim 1, further comprising a step of superimposing diagrams and/or symbols over at least one of said still pictures.

13. The method of claim 12, wherein at least one superimposed symbol or diagram corresponds to a metadata acquired simultaneously with said video sequence.

14. The method of claim 12, wherein superimposition of at least one of said symbols or diagrams is automatically decided when a predetermined condition occurs in a metadata, in the sound track of said video sequence, or in the image content of said video sequence.

15. The method of claim 12, wherein said superimposed symbol or diagram is automatically generated or selected.

16. The method of claim 12, wherein the layout and/or the position and/or the color of said superimposed symbol or diagram is automatically generated or selected.

17. The method of claim 16, wherein said layout, and/or said position, and/or said color depends on the image content of said still picture.

18. The method of claim 1, wherein a written commentary, a graphic, images, video clips and/or an audio comment is added to at least one of said still pictures.

19. The method of claim 1, wherein the key positions in said templates for the motion of a certain sport are defined manually by the user.

20. The method of claim 1, comprising the step of downloading a template for a certain sport from an Internet server or loading it from a disc into said computer.

21. The method of claim 1, wherein at least one of said templates defines at least one comment or recommendation associated with said key position.

22. The method of claim 1, wherein at least one of said templates defines the layout of said still pictures on said display.

23. The method of claim 1, wherein the selection of one of said still pictures initiates the display of said video sequence for the moment corresponding to said still picture.

24. The method of claim 1, comprising the step of downloading prerecorded still pictures at key positions from an Internet server or loading it from a disc into said computer.

25. The method of claim 1, comprising the step of comparing the extracted still pictures at the key positions from the motion of an athlete with pre-recorded or other still pictures recorded by the same user at the same key position of the same motion.

26. The method of claim 25, wherein the step of comparing includes superimposing said pre-recorded still pictures with the extracted still pictures or the displaying of one still picture beside the other.

27. The method of claim 1, wherein a plurality of series of still pictures corresponding to different executions at different times of said motion by one or different athletes or teams are stored in a single document.

28. The method of claim 1, further comprising a step of generating a multimedia document including said still pictures and recorded metadata.

29. The method of claim 28, further comprising a step of generating a multimedia document including said video sequence, said still pictures and metadata.

30. The method of claim 28, said multimedia document being stored on a CD-ROM, on a DVD and/or as a browser-enabled document.

31. A computer method for analyzing a motion of a person or of a team during a sport activity, said method comprising the steps of:
defining different templates for different motions, each of said templates determining a number of key positions for said motions, said at least one key position being of particular interest for analyzing the correct execution of said motion,
defining in said templates at least one condition for triggering automatic extraction of one still picture at one of said key positions,
determining in said template symbols or graphics to superimpose onto said still picture,
acquiring at least one video sequence of said motion of the person or the team in a single scene,
extracting foreground features of the video content of the video sequence corresponding to said at least one predefined key position,
determining at least one still picture corresponding to the at least one key position to be extracted from said at least one video sequence on the basis of the extracted foreground features,
displaying the at least one still picture determined on a display device, and
superimposing onto said still picture graphics or symbols according to said template.

32. A computer method for analyzing a motion of a person or of a team during a sport activity, said method comprising the steps of
defining different templates for different motions, each of said templates determining a number of key positions for said motions, said at least one key position being of particular interest for analyzing the correct execution of said motion,
defining in said templates at least one condition for triggering automatic extraction of one still picture at one of said key positions,
determining in said template symbols or graphics to superimpose onto said still picture,
acquiring at least one video sequence of said motion of the person or the team in a single scene,
automatically extracting at least one still picture corresponding to the at least one key position from said at least one video sequence, displaying the at least one extracted still picture on a display device, and superimposing onto said still picture graphics or symbols according to said template,
wherein the at least one still picture corresponding to the at least one key position is automatically extracted detecting in a sound track of said video sequence recorded simultaneously with said video sequence a sound corresponding to said key position.

33. A non-transitory computer readable medium for storing a program which, when executing said program on a computer, analyzes a motion of a person or of a team during an activity, performs the following steps:
defining different templates for different motions, each of said templates determining a number of key positions for said motions, said at least one key position being of particular interest for analyzing the correct execution of said motion,
defining in said templates at least one condition for triggering automatic extraction of one still picture at one of said key positions, determining in said template symbols or graphics to superimpose onto said still picture, acquiring by the computer, at least one video sequence of said motion of the person or the team in a single scene, automatically extracting by the computer, at least one still picture corresponding to the at least one key position from said at least one video sequence, displaying the at least one extracted still pictures on a display device, and superimposing onto said still picture graphics or symbols according to said template, wherein at least one of said still picture corresponding to the at least one key position is automatically extracted by detecting in an image content of said video sequence features of said key position, and by using one or a combination of the following:

using metadata recorded with a sensor for determining a key position of particular interest and recorded simultaneously with said video sequence, and detecting in a sound track of said video sequence recorded simultaneously with said video sequence a sound corresponding to said key position.

34. The non-transitory computer readable medium of claim 33, further storing a multimedia document containing at least still pictures with or without the metadata.

35. The non-transitory computer readable medium of claim 34, wherein the medium contains a video sequence.

36. The method of claim 1, wherein said step of using metadata recorded with said video sequence comprises trigger signals with some moments of said video sequence.

37. The computer method according to claim 31, wherein the foreground features correspond to a person or team in said video sequence performing said motion to be analyzed.

38. The computer method according to claim 37, wherein the foreground features are extracted on the basis of the fact that background features move slower than the foreground features within the video sequence.

* * * * *